United States Patent
Janninck et al.

[11] Patent Number: 6,157,545
[45] Date of Patent: *Dec. 5, 2000

[54] BATTERY CONNECTION APPARATUS WITH END PROJECTIONS

[75] Inventors: Mark Daniel Janninck, Elmhurst; Brian Jon Hassemer, Gurnee, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/078,458

[22] Filed: May 14, 1998

[51] Int. Cl.⁷ .............................. H04B 1/03; H01M 2/10
[52] U.S. Cl. .................... 361/814; 361/807; 455/575; 379/433; 320/107; D14/138; 429/100
[58] Field of Search ...................... 361/814, 807; 455/90, 572, 573, 575, FOR 121; 379/433, 428; 320/107, 114; D13/103; 429/96–100; D14/138

[56] References Cited

U.S. PATENT DOCUMENTS

| | | |
|---|---|---|
| D. 374,424 | 10/1996 | Nagele et al. . |
| D. 375,932 | 11/1996 | Nagele et al. . |
| D. 376,127 | 12/1996 | Nagele et al. . |
| D. 386,742 | 11/1997 | Amero, Jr. et al. . |
| 3,728,664 | 4/1973 | Hurst . |
| 3,969,796 | 7/1976 | Hodsdon et al. . |
| 4,213,078 | 7/1980 | Ferrell et al. . |
| 4,469,765 | 9/1984 | McCartney et al. . |
| 4,532,194 | 7/1985 | Liautaud et al. . |
| 4,653,115 | 3/1987 | Holcomb . |
| 4,871,629 | 10/1989 | Bunyea . |
| 4,904,549 | 2/1990 | Goodwin et al. . |
| 4,943,498 | 7/1990 | Cooper et al. . |
| 4,969,206 | 11/1990 | Desrochers . |
| 5,225,760 | 7/1993 | Leiserson . |
| 5,251,329 | 10/1993 | Takagi et al. . |
| 5,308,716 | 5/1994 | Shababy et al. . |
| 5,317,247 | 5/1994 | Chong et al. . |
| 5,360,683 | 11/1994 | Broadfield . |
| 5,378,556 | 1/1995 | Yung . |
| 5,436,088 | 7/1995 | Castaneda et al. . |
| 5,457,376 | 10/1995 | Chong et al. . |
| 5,460,906 | 10/1995 | Leon et al. . |
| 5,506,488 | 4/1996 | Leiserson . |
| 5,525,888 | 6/1996 | Toya . |
| 5,535,437 | 7/1996 | Karl et al. . |
| 5,604,050 | 2/1997 | Brunette et al. . |
| 5,607,791 | 3/1997 | Garcia et al. . |
| 5,607,792 | 3/1997 | Garcia et al. . |
| 5,620,242 | 4/1997 | Leon et al. . |
| 5,635,814 | 6/1997 | Afzal et al. . |
| 5,656,876 | 8/1997 | Radley et al. . |
| 5,697,070 | 12/1997 | Liebler . |

FOREIGN PATENT DOCUMENTS

| | | |
|---|---|---|
| 2302232 | 1/1997 | United Kingdom . |
| WO9210004 | 6/1992 | WIPO . |

OTHER PUBLICATIONS

U.S. pat. application ser. No. 08/710,912 by Paulick, entitled "Contact Arrangement," filed Sep. 24, 1996, Assignee: Motorola, Inc. U.S. Pat No. 5,854,549.

*Primary Examiner*—Jayprakash N. Gandhi
*Attorney, Agent, or Firm*—Mark D. Patrick; Hisashi D. Watanabe

[57] ABSTRACT

A battery connection apparatus (116) has a housing (1706) with two ends (1708 and 1709) and a surface (1712) extending between the ends (1708, 1709). The housing (1706) is thin such that the surface (1712) is substantially larger in area than the ends (1708, 1709). A battery (1702) is disposed in the housing (1706). The apparatus (116) has mating projections (1722, 1800) extending from each end (1708 and 1709). The apparatus (116) also has contacts (1730–1733) located at the surface (1712) rather than at an end (1708 and 1709). The contacts (1730–1733) are electrically connected to the battery (1702). This apparatus (116) stands alone as a low profile battery pack, or may further include structure resident on an electronic device (100) to connect the battery (1702) to electronic circuitry (1700) of the electronic device (100) to realize a reduction in form factor thickness.

16 Claims, 7 Drawing Sheets

BATTERY CONNECTION APPARATUS WITH END PROJECTIONS

FIELD OF THE INVENTION

The present invention relates generally to batteries and, more particularly, to apparatuses for connecting batteries for use as power supplies.

BACKGROUND OF THE INVENTION

Portable electronic devices, including wireless telephony devices such as cellular telephones, are powered by an electrochemical battery cell or battery, for short. The battery is electrically connected to the electronic circuitry of the portable electronic device by way of a connection apparatus. The connection apparatus includes a housing enclosing the battery and a housing enclosing the electronic circuitry. The housings employ reciprocal mating features for attachment and detachment of the battery to and from the electronic circuitry. Such removability is important as it permits replacement of batteries that have become discharged via operation of the electronic circuitry. Examples of known battery connection apparatuses are disclosed in U.S. patent application Ser. No. 09/010,101 by Stone et al., entitled "Battery Attachment Apparatus," filed on Jan. 21, 1998 and assigned to Motorola, Inc.; U.S. Pat. No. 5,436,088 by Castaneda et al., entitled "Battery Cradle," issued on Jul. 25, 1995 and assigned to Motorola, Inc.; and U.S. Pat. No. 4,532,194 by Liautaud et al., entitled "Housing For a Battery Operated Transceiver," issued on Jul. 30, 1985.

To remain competitive in the portable electronic device market, manufacturers must continually work towards miniaturization of such devices. In any effort to reduce the thickness of the devices, batteries are made thinner. As a result, a need has arisen for a new battery connection apparatus capable of accommodating a thin battery without sacrificing the thickness reduction earned by the thin battery.

DETAILED DESCRIPTION OF THE PREFERRED EMBODIMENTS

A battery connection apparatus has a housing with two ends and a surface extending between the ends. The housing is thin such that the surface is substantially larger in area than each of the ends. A battery is disposed in the housing. The apparatus has a projection extending from each end. The apparatus also has contacts that are located at the surface of the housing rather than at an end of the housing. The contacts are electrically connected to the battery. This apparatus stands alone as a low profile battery pack, or may further include structure resident on an electronic device to connect the battery to electronic circuitry of the electronic device to realize a reduction in form factor thickness. The additional structure of the apparatus includes the following: a second housing containing the electronic circuitry and having a recess for receiving the battery pack housing; receiving slots in the recess for receiving the projections; and contacts, electrically connected to the electronic circuitry, in the recess for mating with the battery pack contacts.

Figure 1:
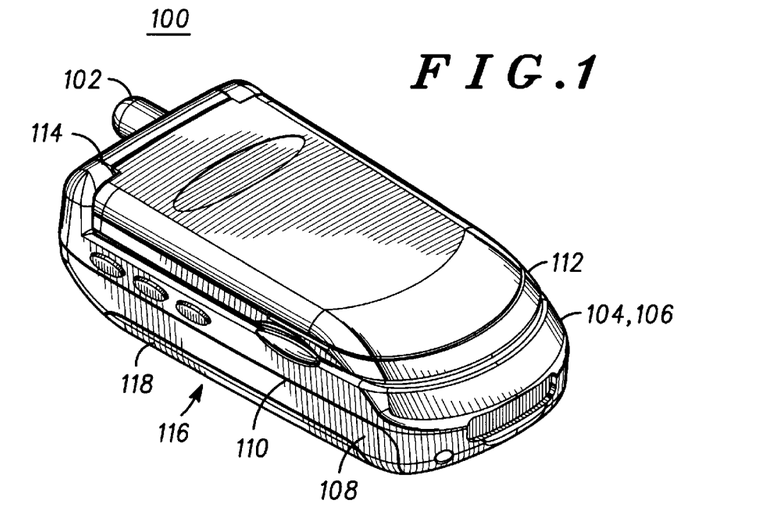
FIG. 1 is a perspective view of a portable electronic device in a closed position.
Figure 2:
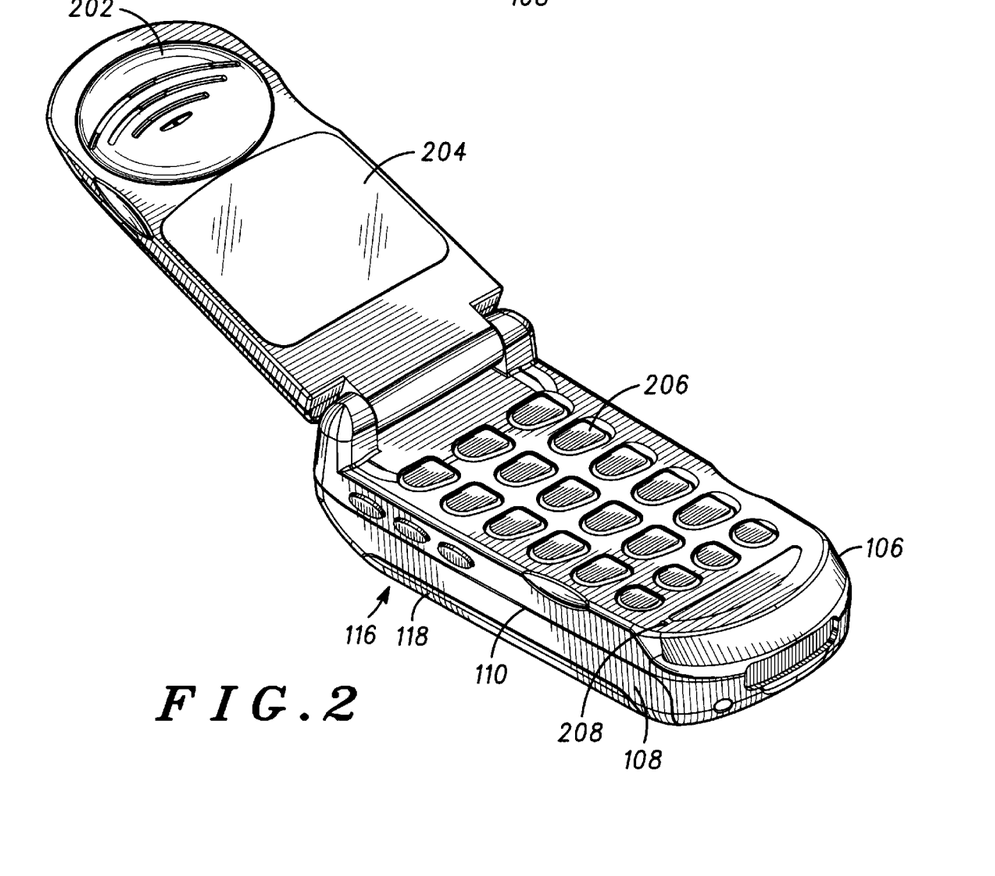
FIG. 2 is a perspective view of the device of FIG. 1 in an opened position.

A portable electronic device 100 is illustrated in FIGS. 1 and 2 as a wireless telephony device or, more particularly, a cellular telephone. The electronic device 100 employs an antenna 102 and a transceiver circuit 1700 of FIG. 3 to communicate wireless signals to and from one or more remote devices. The antenna 102 of FIG. 1 is carried on a bottom housing 104 of the device 100, while the transceiver circuit 1700 is carried on a circuit board 1701 of FIG. 3 that is disposed between front and back housing portions 106 and 108 of the bottom housing 104, which are matable along junction 110. A top housing 112 of the radiotelephone 100 is rotatably coupled to the bottom housing 104 via a hinge 114 such that the electronic device 100 is movable from a closed or stowed position shown in FIG. 1 to an opened or in-use position shown in FIG. 2. In the opened position, a user operates the electronic device 100 via a user interface of an earpiece 202, a display area 204, a keypad 206 and a microphone area 208. The electronic device 100 is powered by a battery 1702 of FIG. 3 that is coupled to the transceiver circuit 1700 via a battery connection apparatus 116 of which a detachable cover 118 is shown in FIGS. 1 and 2 to be attached to the back housing portion 108.

Figure 3:
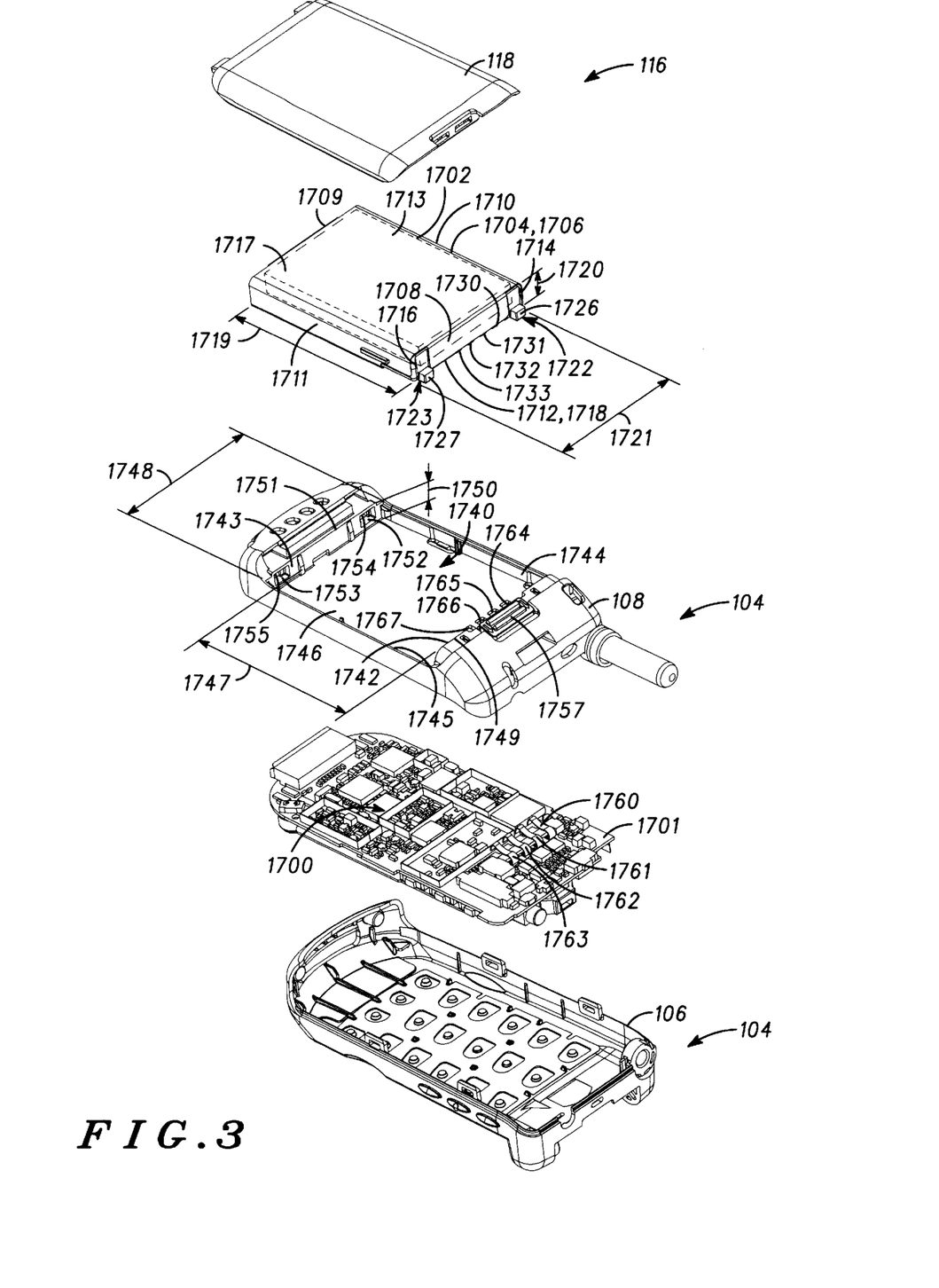
FIG. 3 is an exploded rear, left side and top perspective view of a bottom housing of the device of FIG. 1 showing a battery connection apparatus embodied in, all or part of, a cover, a battery pack, a back housing portion, a transceiver board and a front housing portion.
Figure 8:
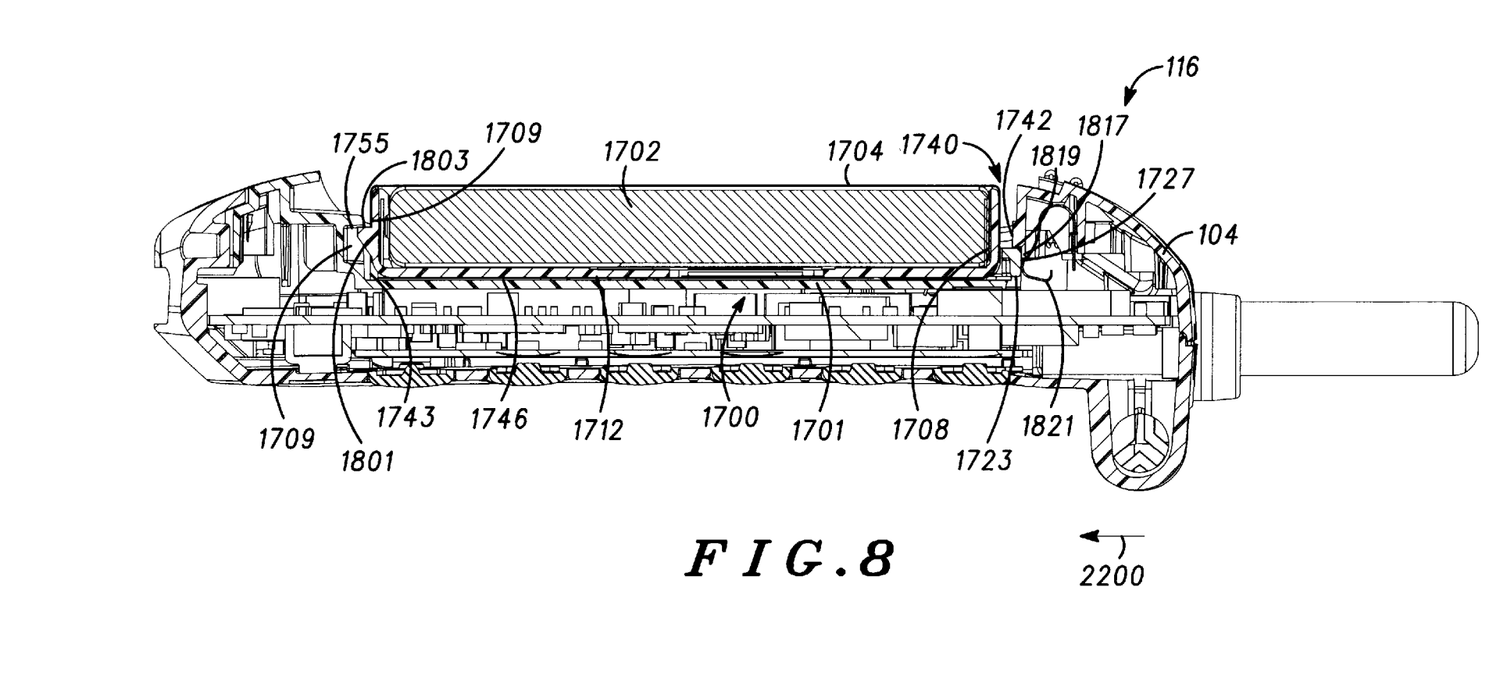
FIG. 8 is a first cross-sectional view of the battery pack received by the bottom housing taken across section lines 8—8 in FIG. 7.
Figure 9:
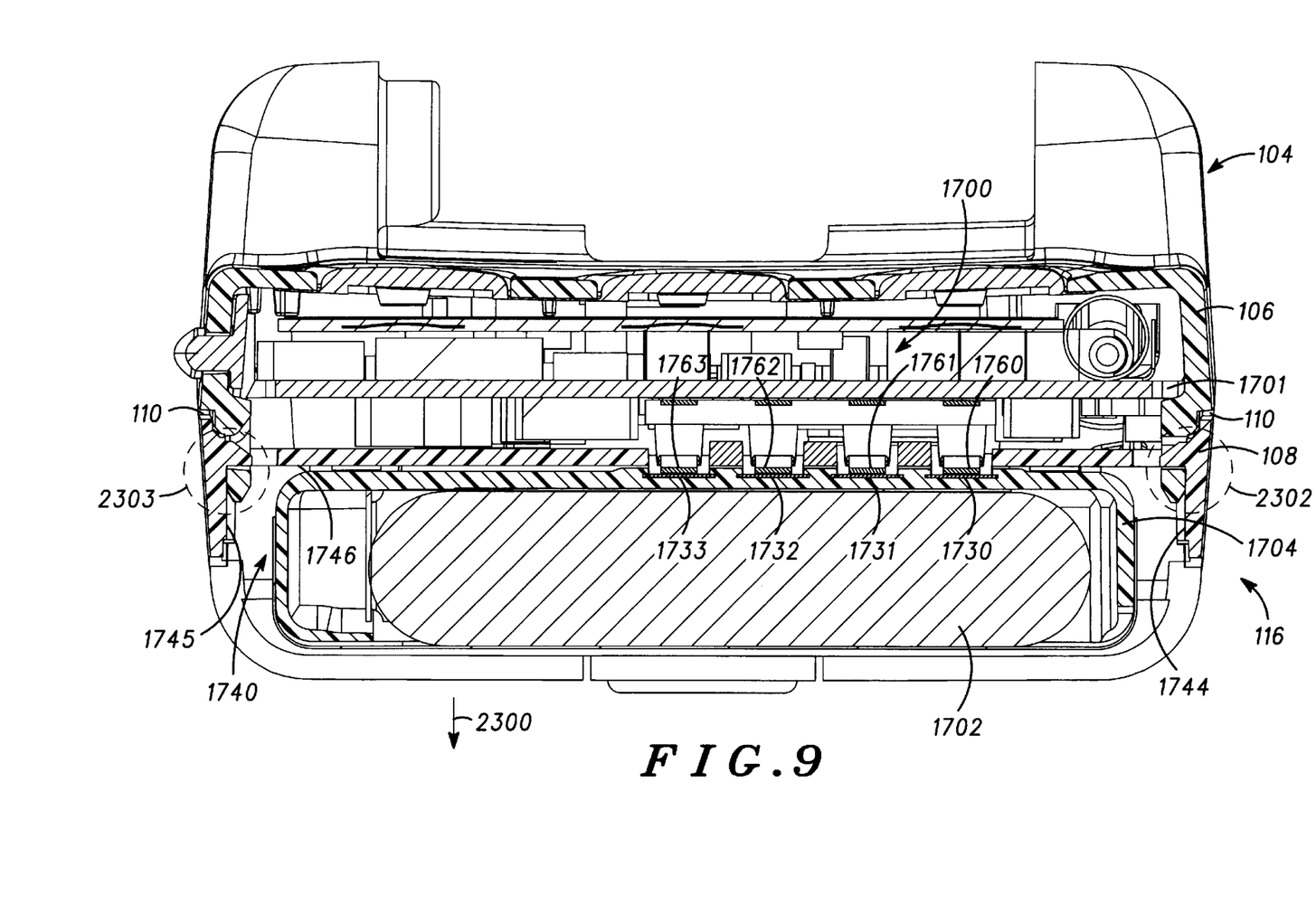
FIG. 9 is a second cross-sectional view of the battery pack received by the bottom housing taken across section lines 9—9 in FIG. 7.

The battery 1702, which is illustrated in dotted lines in FIG. 3 and shown in full lines in FIGS. 8 and 9, is contained within a battery pack 1704 of the battery connection apparatus 116. The battery 1702 is of a substantially standard rectangular solid shape that is closely conformed to by a housing 1706 of the battery pack 1704 that surrounds the battery 1702. Housing 1706 has a tray portion that is molded from polycarbonate or other suitable material to have front and rear ends 1708 and 1709; a right side 1710 extending between, and orthogonal to, the ends 1708 and 1709 and joining end 1708 at edge 1714; a left side 1711 extending between, and orthogonal to, the ends 1708 and 1709 and joining end 1708 at edge 1716; and a bottom surface 1712 extending between, and orthogonal to, the ends and sides 1708–1711 and joining end 1708 at edge 1718. The tray portion receives and supports the battery 1702. An adhesive label 1717, which defines a top surface 1713 of housing 1706, covers the battery 1702 and partially over wraps the ends, sides and surface 1708–1712. The adhesive label 1717 is die cut from mylar or other suitable material. The battery 1702 and housing 1706 are thin, as exemplified by the surfaces 1712 and 1713 having a substantially larger area than any one of the ends and sides 1708–1711. In a preferred embodiment, a height 1720 of end 1708 (and end 1709) is approximately 7 mm; a length 1721 of end 1708 (and end 1709) (i.e., the width of housing 1706) is approximately 35 mm; and a distance 1719 between the ends 1708 and 1709 (i.e., the length of surface 1712 and length of housing 1706) is approximately 50 mm.

Figure 4:
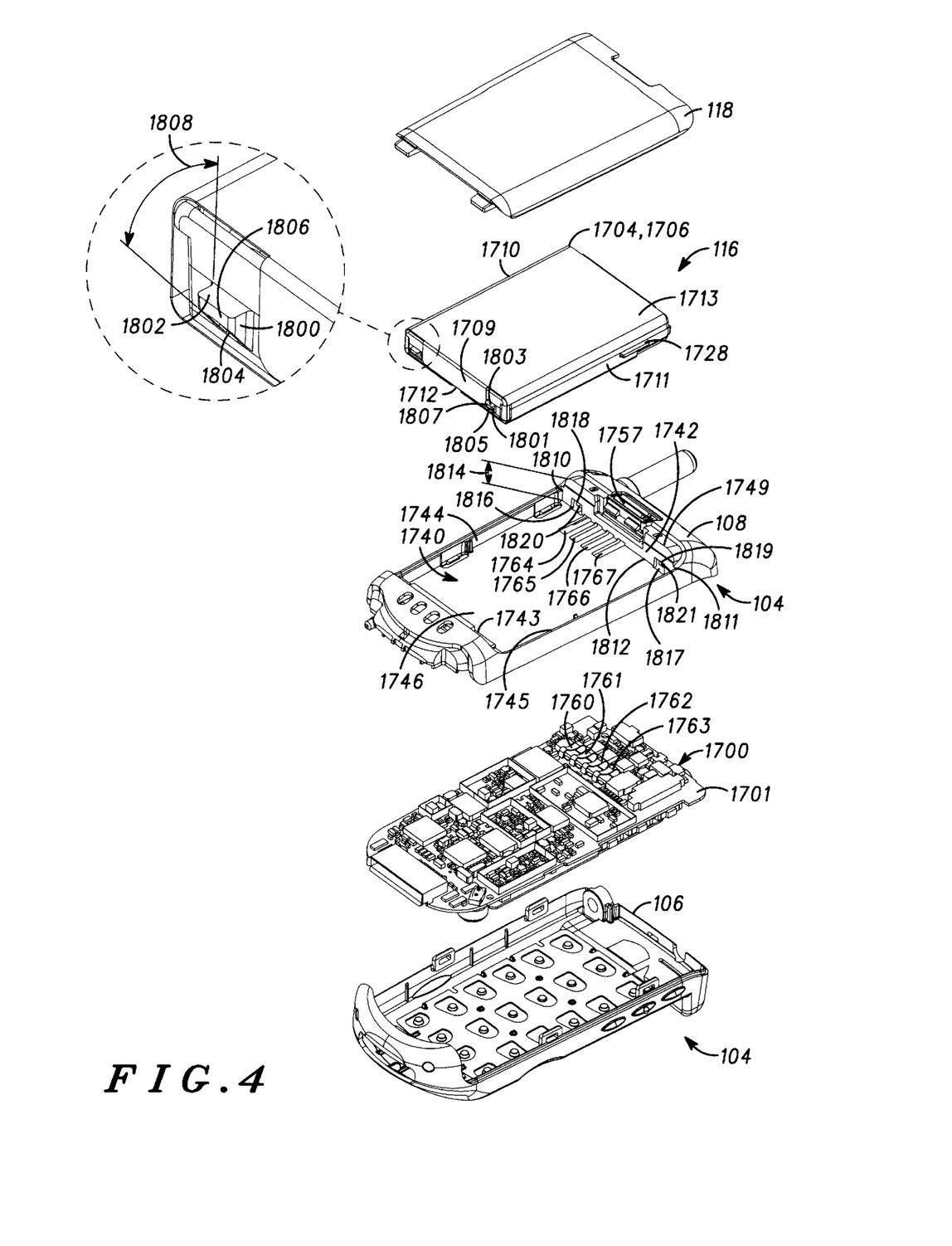
FIG. 4 is an exploded rear, left side and bottom perspective view of the bottom housing of the device of FIG. 1 showing the battery connection apparatus of FIG. 3, a portion of the battery pack shown using an enlargement window.
Figure 5:
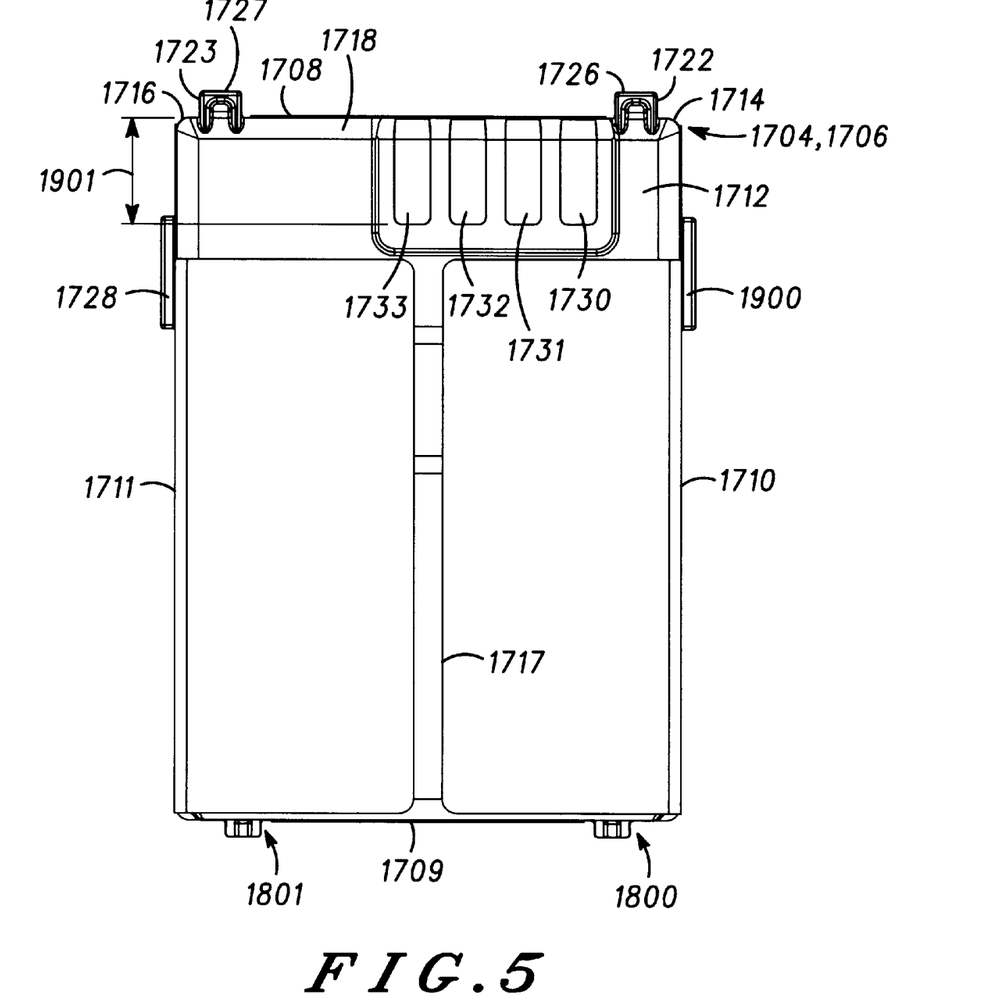
FIG. 5 is a bottom plan view of the battery pack of FIG. 3.

The battery pack 1704 has mating projections 1722, 1723, 1800 and 1801, as shown in FIGS. 3–5, carried on housing 1706. Projections 1722 and 1723 are located on end 1708 at edge 1718 to extend coplanarly with surface 1712. Projection 1722 is further located on the right half of end 1708 (i.e., between the middle of end 1708 and edge 1714), such as about 1 mm from edge 1714. Projection 1723 is further located on the left half of end 1708 (i.e., between the middle of end 1708 and edge 1716), such as about 1 mm from edge 1716. Projections 1722 and 1723 have respective distal ends 1726 and 1727 with substantially flat, rectangular surfaces parallel to end 1708. In the illustrated embodiment, each of the distal ends 1726 and 1727 are about 3 mm wide, about 2 mm tall and about 1.85 mm from end 1708.

Projections 1800 and 1801 are located on left and right halves of end 1709, respectively, such as about 4 mm from the sides 1710 and 1711, respectively. Projections 1800 and 1801 have respective top surfaces 1802 and 1803 that are parallel to surfaces 1712 and 1713 of housing 1706, and respective bottom surfaces 1804 and 1805 that are angled with respect to end 1709 of housing 1706. A distal end 1806 of projection 1800 is formed from convergence of top and bottom surfaces 1802 and 1804, and a distal end 1807 of projection 1801 is formed from convergence of top and bottom surfaces 1803 and 1805. Distal ends 1806 and 1807 are smaller in area than distal ends 1726 and 1727 of projections 1722 and 1723. In the illustrated embodiment, the bottom surfaces 1804 and 1805 form an angle 1808, which is preferably 35 degrees but can alternately be anywhere between 30 degrees and 70 degrees, with respect to end 1709 of housing 1706; and distal ends 1806 and 1807 are about 2 mm wide and about 1.2 mm from end 1709.

One skilled in the art will appreciate that by equipping the battery pack 1704 with the mating projections 1722, 1723, 1800 and 1801, rather than the mating recesses of prior art battery connection apparatuses, no additional space for recesses needs to be reserved at the ends 1708 and 1709; thereby, allowing for reduction in the length of the housing 1706 (i.e., the length 1719) and a better fit of housing 1706 to the standard rectangular solid shape of the battery 1702.

The battery pack 1704 has elongated fins 1900 and 1728 located on right and left sides 1710 and 1711, respectively, of housing 1706. In particular, fin 1900 is located at the front half of side 1710 (i.e., between the middle of side 1710 and edge 1716), while fin 1728 is located at the front half of side 1711 (i.e., between the middle of side 1710 and edge 1714).

The battery pack 1704 has contacts 1730, 1731, 1732 and 1733 carried on surface 1712 of housing 1706. Contacts 1730–1733 are located on the front half of surface 1712 (i.e., between the middle of surface 1712 and end 1708) such that a portion of each of contacts 1730–1733 overlaps edge 1718. Contacts 1730–1733 are positioned on surface 1712, the largest surface of housing 1706, so they can be dimensioned to ensure accurate connectivity. In the illustrated embodiment, each of contacts 1730–1733 has a length 1901, such as about 8 mm, which is greater than the height 1720 of end 1708, a width of about 2.5 mm and a spacing from neighboring ones of contacts 1730–1733 of about 1 mm. Contacts 1730–1733 are formed of plated beryllium copper or other suitable metallic material and, preferably, insert molded into housing 1706 so as to be fixed in a position substantially parallel to surface 1712. Contacts 1730–1733 are electrically connected to the battery 1702 and battery circuitry (not shown) disposed in housing 1706 via spot welding or other suitable process.

Thus, the battery connection apparatus 116 is realized in a dimensionally constrained, easily portable battery pack—the battery pack 1704. The projections 1722, 1723, 1800 and 1801 of the battery pack 1704 are suitably located and sufficient in number to permit captivation by any one of numerous plausible mating arrangements. Contacts 1730–1733 are sufficient in location, dimension and spacing to permit easy and accurate connectivity. The benefits of the battery pack 1704 will further be evident from the discussion that follows.

The battery connection apparatus 116 can be further extended to include portions of the electronic device 100 that captivate the battery pack 1704 and electrically connect the battery 1702 to the electronic circuitry of the transceiver circuit 1700. As shown in FIGS. 3 and 4, the battery connection apparatus 116 further includes the bottom housing 104, which has the electronic circuitry of the transceiver circuit 1700 disposed therein and is adapted to receive housing 1706 of the battery pack 1704 in a recess 1740. The recess 1740, as well as the bottom housing 104, is molded from polycarbonate or other suitable material to have front and rear endwalls 1742 and 1743; a right sidewall 1744 extending between, and orthogonal to, the endwalls 1742 and 1743 and joining endwall 1742 at corner 1810; a left sidewall 1745 extending between, and orthogonal to, the endwalls 1742 and 1743 and joining endwall 1742 at corner 1811; and a base 1746 extending between, and orthogonal to, the endwalls and sidewalls 1742–1745 and joining endwall 1742 at corner 1812. In the illustrated embodiment, the endwalls 1742 and 1743 are spaced by a distance 1747, such as about 51.25 mm, which is just slightly larger than a length 1719 of housing 1706 of the battery pack 1704; the sidewalls 1744 and 1745 are spaced by a slightly varying distance 1748, which ranges from about 36.5 mm to about 39 mm and is larger than the width 1721 of housing 1706 of the battery pack 1704; endwall 1742 has a height 1814, such as about 7 mm as measured between the base 1746 and a top edge 1749 of endwall 1742, which is about the same as the height 1720 of end 1708 of housing 1706 of the battery pack 1704; and endwall 1743 has a height 1750, such as 5 mm as measured between the base 1746 and a top edge 1751 of endwall 1743, which is less than the height 1720 of end 1708 of housing 1706 of the battery pack 1704.

Rectangular receiving slots 1752, 1753, 1816 and 1817 of the battery connection apparatus 116, as shown in FIGS. 3 and 4, are formed in the recess 1740 of the bottom housing 104. Receiving slots 1752 and 1753 are located on right and left halves of endwall 1743, respectively, such as about 2 mm from the sidewalls 1744 and 1745, respectively. Receiving slots 1752 and 1753 are bounded adjacent to top edge 1751 of endwall 1743 by inner flat ceiling surfaces 1754 and 1755, respectively. Receiving slots 1816 and 1817 are located on endwall 1742 at corner 1812 so as to be coplanarly aligned with the base 1746. Receiving slot 1816 is further located on the right half of endwall 1742 (i.e., between the middle of endwall 1742 and corner 1810), such as about 3.5 mm from corner 1812. Receiving slot 1817 is further located on the left half of endwall 1742 (i.e., between the middle of endwall 1742 and corner 1811), such as about 3.5 mm from corner 1811. In the illustrated embodiment, receiving slots 1816 and 1817 are slightly more than 3 mm wide and slightly more than 2 mm tall as measured from the base 1746 to top edges 1818 and 1819 of the receiving slots 1816 and 1817, respectively.

Figure 6:
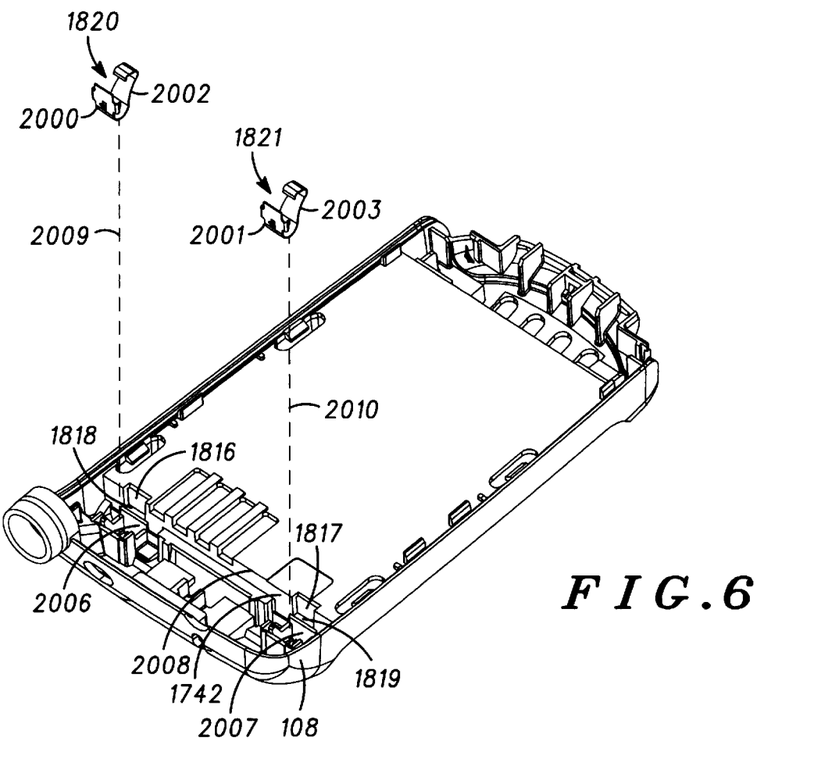
FIG. 6 is a perspective view of an inner surface of the back housing portion of the bottom housing of the device of FIG. 1 showing springs of the battery connection apparatus of FIG. 3 exploded therefrom.

Receiving slots 1816 and 1817 carry springs 1820 and 1821, respectively, of the battery connection apparatus 116. The springs 1820 and 1821 are located in, and do not extend outside of, receiving slots 1816 and 1817, respectively. The springs 1820 and 1821, which are shown in FIG. 6 separated from the back housing portion 108, are substantially V-shaped spring fingers formed of integrally joined front and rear arms 2000, 2001, 2002 and 2003. Each of the front arms 2000 and 2001 employ, on an end opposite to respective ones of the rear arms 2002 and 2003, a mounting surface having a locking tooth. Each of the rear arms 2002 and 2003 employ, on an end opposite to respective ones of the front arms 2000 and 2001, a force receiving, nose-shaped surface. The springs 1820 and 1821, which are shown in a rest position in FIG. 6, are deflectable to move arms 2002 and 2003 towards arms 2000 and 2001, respectively. In the illustrated embodiment, the springs 1820 and 1821 are stamped from a thin sheet of beryllium copper or other suitable material and are bent into the aforementioned configuration so that each of arms 2002 and 2003 exhibit a spring force of about 0.15 N/mm or other suitable value.

Springs 1820 and 1821 are assembled into receptacles 2006 and 2007, respectively, which are formed into an inner surface 2008 of the back housing portion 108 behind receiving slots 1816 and 1817, respectively. Assembly of the springs 1820 and 1821 is depicted by dotted lines 2009 and 2010, respectively. Upon assembly, the mounting surfaces of arms 2000 and 2001 are anchored to the receptacles 2006 and 2007, respectively, while the noses of arms 2002 and 2003 reside in the receiving slots 1816 and 1817, respectively. Once assembled, the nose of each of arms 2002 and 2003, upon reception of a sufficient force, is movable in a plane substantially perpendicular to endwall 1742.

Referring back to FIGS. 3 and 4, the battery connection apparatus 116 further includes a latch 1757 to removably secure the cover 118 in a position enclosing the recess 1740. The latch 1757 is movably carried on the back housing portion 108 and defines a portion of endwall 1742. In the illustrated embodiment, the latch 1757 is located at the middle of endwall 1742 about 6 mm from each of receiving slots 1816 and 1817, and occupies about 70 percent of the height 1814 of the endwall 1742 at that location. Although leaving very little or no space on endwall 1742 for additional structures such as electrical contacts, the latch 1757 permits secure engagement of the cover 118, which is molded to coincide with the thin form factor designated by the back housing portion 108.

The battery connection apparatus 116 further includes contacts 1760, 1761, 1762 and 1763 mounted on the circuit board 1701 and electrically connected to the electronic circuitry of the transceiver circuit 1700. Contacts 1760–1763 are carried in the recess 1740 of the back housing portion 108 following assembly of the circuit board 1701 between the front and back housing portions 106 and 108 such that contacts 1760–1763 extend through slotted openings 1764, 1765, 1766 and 1767, respectively, formed in the base 1746 of the recess 1740. Each of contacts 1760–1763 employ a spring finger having a force receiving, nose-shaped surface that is deflectable in a plane substantially perpendicular to the base 1746. In the illustrated embodiment, each of contacts 1760–1763 are formed of beryllium copper or other suitable metallic material and are bent into the aforementioned configuration so that the nose-shaped surface of each exhibits a spring force of about 0.2 N/mm or other suitable value.

Figure 7:
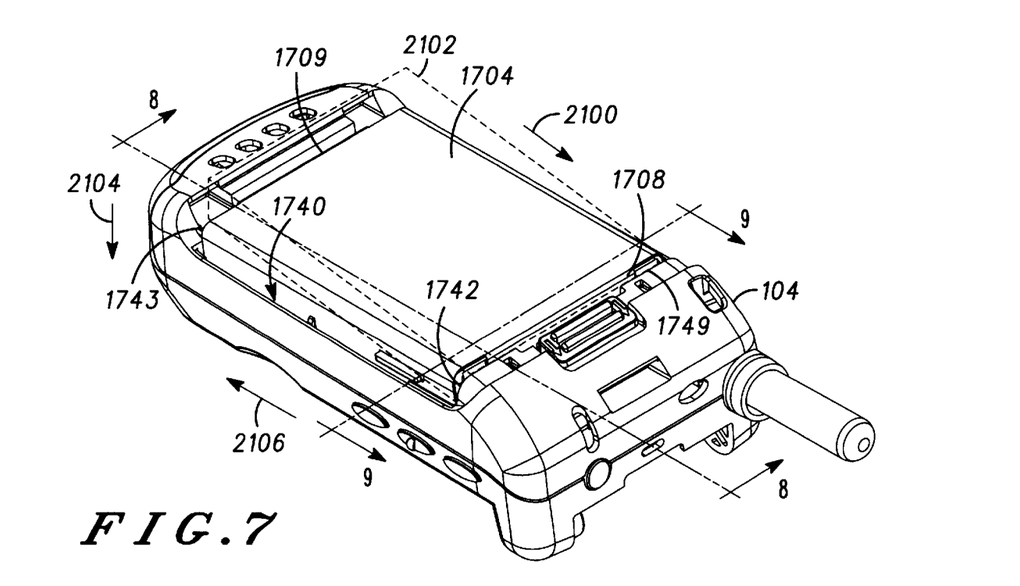
FIG. 7 is a rear, left side and top perspective view of the bottom housing of the device of FIG. 1 showing the battery pack received by the bottom housing.

To utilize the portions of the battery connection apparatus 116 resident on the electronic device 100, the battery pack 1704 is assembled to the bottom housing 104, as shown in FIG. 7. The battery pack 1704 is oriented at a slight angle, such as 15 degrees, with respect to the base 1746 of the recess 1740 of FIGS. 3 and 4 and positioned in the recess 1740 such that a top edge of end 1708 abuts top edge 1749 of endwall 1742, as depicted by arrow 2100 of FIG. 7 and the broken line showing 2102 of the battery pack 1704. Upon abutment of the end 1708 and endwall 1742, projections 1722 and 1723 of FIGS. 3 and 4 are received in receiving slots 1816 and 1817, respectively, such that distal ends 1726 and 1727 of the projections 1722 and 1723 engage and depress springs 1820 and 1821, respectively. Next, end 1709 of the battery pack 1704 is moved into the recess 1740, as depicted by arrow 2104 of FIG. 7, sliding angled surfaces 1804 and 1805 of FIGS. 3 and 4 of projections 1800 and 1801, respectively, past top edge 1751 of endwall 1743. End 1709 is moved until projections 1800 and 1801 align with receiving slots 1752 and 1753, respectively. During this movement of end 1709 of the battery pack 1704, contacts 1730–1733 of the battery pack 1704 engage and depress contacts 1760–1763, respectively, carried in the recess 1740. To complete assembly, the battery pack 1704 is released allowing the springs 1820 and 1821 to extend and urge the battery pack 1704 in the direction of arrow 2106 of FIG. 7 until projections 1800 and 1801 are received in receiving slots 1752 and 1753, respectively.

Once assembled, the battery pack 1704 is securely received in the bottom housing 104 and the battery 1702 is electrically connected to the electronic circuitry of the transceiver circuit 1700. As shown in FIG. 8, end 1708 of the battery pack 1704 juxtaposes, but does not abut, endwall 1742 of the recess 1740; end 1709 of the battery pack 1704 abuts endwall 1743 of the recess 1740; and surface 1712 of the battery pack 1704 juxtaposes the base 1746 of the recess 1740. Projection 1801 is received in receiving slot 1753, and projection 1723 is received in receiving slot 1817. Spring 1821 remains partially loaded to exert a force in the direction of arrow 2200 sufficient to ensure that end 1709 remains in abutment with endwall 1743 and projection 1801 remains received in receiving slot 1753. The combined length of housing 1706 (i.e., the length 1719 of FIG. 3) and projection 1723 is slightly larger than the length 1747 of the recess 1740, thereby, ensuring that projection 1723 remains received in receiving slot 1817. Referring to FIGS. 8 and 9, contacts 1760–1763 exert a force on contacts 1730–1733, respectively, in the direction of arrow 2300 that ensures good electrical connectivity between contacts 1730–1733 and 1760–1763 and, also, further secures the battery pack 1704 by biasing surface 1803 of projection 1801 against surface 1755 of receiving slot 1753 and biasing projection 1723 against top edge 1819 of receiving slot 1817.

To avoid separation or gapping at the junction 110 of the front and back housing portions 106 and 108 that could result from the force exerted by the contacts 1760–1763 on the back housing portion 108 via the battery pack 1704, the battery connection apparatus 116 further includes housing snaps 2302 and 2303 positioned in-line with contacts 1760–1763. The housing snaps 2302 and 2303, which operate to join the front and back housing portions 106 and 108, are integrally formed on the front housing portion 106 and the base 1746 of the recess 1740 proximate to the sidewalls 1744 and 1745, respectively. In particular, as shown in FIGS. 3, 4 and 9, each of the snaps 2302 and 2303 is formed of an interlocking loop and toothed slot. By locating the snaps 2302 and 2303 so that contacts 1760–1763 are aligned therebetween, as shown in FIG. 9, a more reliable, robust attachment of the front and back housing portions 106 and 108, which is capable of withstanding forces exerted by contacts 1760–1763, is realized.

The battery pack 1704 is disassembled from the bottom housing 104 by substantially reversing the steps previously described with respect to assembly shown in FIG. 7. First the battery pack 1704 is pushed in the direction opposite to arrow 2106 until projections 1800 and 1801 are removed receiving slots 1752 and 1753, respectively; springs 1820 and 1821 in receiving slots 1816 and 1817, respectively, are depressed by projections 1722 and 1723, respectively; and end 1708 abuts endwall 1742. Next, end 1709 of the battery pack 1704 is swung in the direction opposite to arrow 2104 until projections 1800 and 1801 clear endwall 1743. Once clear, the battery pack 1704 can be lifted away from the recess 1740 and the bottom housing 104.

Aside from releasable attachment to the electronic device 100, it will be recognized that the battery connection apparatus 116 formed of the battery pack 1704 permits connection to other devices, such as a desktop charging device. For example, the fins 1728 and 1900 of the battery pack 1704 allow vertical positioning in a well of the charging device by engaging opposing vertical guide slots formed therein. Such positioning, permits a reduction in the length and total footprint area of the charging device.

While particular embodiments have been shown and described, modifications may be made. For example, the battery connection apparatus 116 could employ only single centralized projections on each of ends 1708 and 1709 of housing 1706 to effectuate mating. The flat, fixed contacts 1730–1733 of housing 1706 could alternatively be replaced with spring contacts. Although shown to be incorporated into a wireless telephony device such as a radiotelephone, it will be recognized that the battery connection apparatus 116 may also be beneficially used in pagers, laptop computers, personal digital assistants, landline telephones, cordless telephones, two-way radios, portable cassette recorders and players, universal or backup power supplies, and the like. It is therefore intended in the appended claims to cover all such changes and modifications which fall within the true spirit and scope of the invention.

What is claimed is:

1. A battery connection apparatus comprising:
a housing having a battery disposed therein, the housing comprising a first end, a second end and a surface extending therebetween, the first and second ends having a height, the surface substantially larger in area than any of the first and second ends;
first and second projections carried on the housing, the first projection located at the first end, the second projection located at the second end; and
a plurality of contacts carried on the housing, the plurality of contacts located at the surface, the plurality of contacts electrically connected to the battery, at least one of the plurality of contacts has a length, the length greater than the height.

2. A battery connection apparatus comprising:
a housing having a battery disposed therein, the housing comprising a first end, a second end and a surface extending therebetween, the surface joining the first end at a first edge, the surface substantially larger in area than any of the first and second ends;
first and second projections carried on the housing, the first projection located at the first edge and extending coplanarly with the surface, the second projection located at the second end; and
a plurality of contacts carried on the housing, the plurality of contacts located at the first edge and extending toward the second end, the plurality of contacts electrically connected to the battery.

3. A battery connection apparatus according to claim 2 further comprising a third projection carried on the housing and extending from the first end, the third projection located at the first edge and extending coplanarly with the surface.

4. A battery connection apparatus according to claim 3 wherein the housing further comprises first and second sides extending between the first and second ends, the first side joining the first end at a second edge, the second side joining the first end at a third edge,
the first projection is further located between the second edge and a middle of the first end, and
the third projection is further located between the third edge and the middle of the first end.

5. A battery connection apparatus comprising:
a housing having a battery disposed therein, the housing comprising a first end, a second end and a surface extending therebetween, the surface substantially larger in area than any of the first and second ends;
first and second projections carried on the housing, the first projection located at the first end, the second projection located at the second end, the second projection defined by a first surface substantially parallel to the surface of the housing and a second surface positioned at an angle between 30 degrees and 70 degrees with respect to the second end of the housing; and
a plurality of contacts carried on the housing, the plurality of contacts located at the surface, the plurality of contacts electrically connected to the battery.

6. A battery connection apparatus comprising:
a first housing having a battery disposed therein, the first housing comprising a first end, a second end and a surface extending therebetween, the surface substantially larger in area than any of the first and second ends;
first and second projections carried on the first housing, the first projection located at the first end, the second projection located at the second end;
a first plurality of contacts carried on the first housing, the first plurality of contacts located at the surface, the first plurality of contacts electrically connected to the battery;
a second housing having electronic circuitry disposed therein, the second housing adapted to receive the first housing, the second housing comprising a recess defined by a first endwall, a second endwall, and a base extending therebetween;
first and second receiving slots formed in the second housing, the first receiving slot located in the first endwall, the second receiving slot located in the second endwall; a second plurality of contacts carried in the recess, the second plurality of contacts located at the base, the second plurality of contacts electrically connected to the electronic circuitry; and
wherein, upon reception of the first housing, the first projection is received in the first receiving slot, the second projection is received in the second receiving slot and the surface juxtaposes the base, thereby mating the first and second plurality of contacts and electrically connecting the battery to the electronic circuitry.

7. A battery connection apparatus according to claim 6 wherein the first and second ends of the first housing are a first distance apart, and the first and second endwalls of the recess of the second housing are a second distance apart, the first distance less than the second distance.

8. A battery connection apparatus according to claim 7 wherein the first plurality of contacts are fixed in a position substantially parallel to the surface, and the second plurality of contacts are deflectable in a first plane perpendicular to the base.

9. A battery connection apparatus according to claim 8 wherein the second housing further comprises first and second housing portions, the first and second housing portions are joined at a junction by a plurality of snaps formed thereabout, the second plurality of contacts aligned between opposing ones of the plurality of snaps.

10. A battery connection apparatus according to claim 6 further comprising a first spring carned in the first receiving slot.

11. A battery connection apparatus according to claim 10 wherein the first spring is a substantially v-shaped spring finger formed of integrally joined first and second arms, the first arm having one end anchored to the second housing and the other end joined to the second arm, and the second arm having one end joined to the first arm and the other end positioned in the first receiving slot, the other end of the second arm movable in a second plane substantially perpendicular to the first endwall.

12. A battery connection apparatus according to claim 6 wherein the recess is further defined by first and second sidewalls extending between the first and second endwalls, the first sidewall joining the first endwall at a first corner, the second sidewall joining the first endwall at a second corner, the first receiving slot is located in the first endwall between the first corner and a middle of the first endwall, the first housing further comprises first and second sides extending between the first and second ends, the first side joining the first end at a second edge, the second side joining the first end at a third edge, and the first projection is located between the second edge and a middle of the first end, and further comprising:

third receiving slot formed in the second housing, the third receiving slot located in the first endwall between the second corner and the middle of the first endwall; and a third projection carried on the first housing and extending from the first end, the third projection is located between the third edge and the middle of the first end, and, upon reception of the first housing, the third projection is received in the third receiving slot.

13. A battery connection apparatus according to claim 12 further comprising:

a cover; and a latch to removably secure the cover in a position enclosing the recess, the latch movably carried on the second housing, the latch defining at least a portion of the first endwall and located at the middle thereof between the first and third receiving slots.

14. A battery connection apparatus according to claim 13 wherein the endwall has a second height, and the latch occupies more than one half of the second height.

15. A battery pack comprising:

a housing having a battery disposed therein, the housing is substantially rectangular and defined by first and second ends, first and second sides and top and bottom surfaces, the bottom surface joining the first end at a first edge, the first side joining the first end at a second edge, the second side joining the second end at a third edge, the bottom surface substantially larger in area than the first and second ends and the first and second sides;

a pair of projections carried on the first end of the housing, the pair of projections located at the first edge and extending coplanarly with the bottom surface, one of the pair of projections further located between the second edge and a middle of the first end, the other of the pair of projections further located between the third edge and the middle of the first end;

at least one projection carried on the second end of the housing, the at least one projection defined by a surface extending parallel to the bottom surface of the housing and a second surface extending at an angle between 35 degrees and 55 degrees with respect to the second end of the housing; and a plurality of contacts carried on the housing, the plurality of contacts located at the bottom surface between the first edge and a middle of the bottom surface, the plurality of contacts electrically connected to the battery.

16. A battery-powered electronic device comprising:

an electronic device comprising:

a device housing having a first housing portion, a second housing portion, and electronic circuitry disposed therebetween, the first housing portion having a recess defined by first and second endwalls, first and second sidewalls, and a base extending therebetween, the first sidewall joining the first endwall at a first corner, the second sidewall joining the first endwall at a second corner, the device housing having a plurality of snaps integrally formed on the second housing portion and the base of the recess proximate to the first and second sidewalls, the plurality of snaps joining the first and second housing portions, a pair of receiving slots formed on the first endwall of the recess, one of the pair of receiving slots located between the first corner and a middle of the first endwall, the other one of the pair of receiving slots located between the second corner and the middle of the first endwall, a pair of springs carried in the recess, one of the pair of springs located in the one of the pair of receiving slots, the other one of the pair of springs located in the other of the receiving slots, at least one receiving slot formed in the second endwall of the recess, and a first plurality of contacts carried in the recess, the first plurality of contacts located at the base and aligned between one of the plurality of snaps proximate to the first sidewall and one of the plurality of snaps proximate to the second sidewall, each of the first plurality of contacts being a spring and being electrically connected to the electronic circuitry; and a battery pack received by the electronic device, the battery pack comprising:
- a battery pack housing having a battery disposed therein, the battery pack comprising first and second ends and a bottom surface extending tberebetween, the first end juxtaposed with the first endwall, the second end in abutment with the second endwall, and the bottom surface juxtaposed with the base,
- a pair of projections carried on the first end of the battery pack housing, one of the pair of projections received in the one of the pair of receiving slots and depressing the one of the pair of springs, the other of the pair of projections received in the other one of the pair of receiving slots and depressing the other one of the pair of springs,
- at least one projection carried on the second end of the battery pack housing, the at least one projection received in the at least one receiving slot, and
- a second plurality of contacts carried on the bottom surface and electrically connected to the battery, the second plurality of contacts depressing the first plurality of contacts and, thereby, electrically connecting the battery to the electronic circuitry.

* * * * *

UNITED STATES PATENT AND TRADEMARK OFFICE
CERTIFICATE OF CORRECTION

PATENT NO. : 6,157,545
DATED : December 5, 2000
INVENTOR(S) : Janninck, Mark D. et al.

It is certified that error appears in the above-indentified patent and that said Letters Patent is hereby corrected as shown below:

Claim 10, line 24:

Please replace "carned" with carried

Claim 12, line 53:

Please insert "a" before third

Signed and Sealed this

Eighth Day of May, 2001

Attest:

NICHOLAS P. GODICI

Attesting Officer      Acting Director of the United States Patent and Trademark Office